United States Patent

Buschmann et al.

[15] 3,636,522
[45] Jan. 18, 1972

[54] PROGRAM CONTROL MECHANISM FOR A LONG DISTANCE COMMUNICATION EXCHANGE INSTALLATION CONTROLLED BY A CONCENTRATEDLY STORED PROGRAM

[72] Inventors: Klaus Buschmann, Munich; Walter Meyer, Alling, both of Germany

[73] Assignee: Siemens Aktiengesellschaft, Munich, Germany

[22] Filed: Jan. 24, 1969

[21] Appl. No.: 793,714

[30] Foreign Application Priority Data

Jan. 25, 1968 Switzerland ..................1192/68

[52] U.S. Cl. ............................340/172.5, 179/18 ES
[51] Int. Cl. ...........................................G06f 9/12
[58] Field of Search............235/157; 340/172.5; 179/18 ES

[56] References Cited

UNITED STATES PATENTS

| | | | |
|---|---|---|---|
| 3,208,047 | 9/1965 | Ridler | 340/172.5 |
| 3,345,611 | 10/1967 | Eachus | 340/172.5 |
| 3,404,378 | 10/1968 | Threadgold et al. | 340/172.5 |
| 3,426,332 | 2/1969 | Cenfetelli | 340/172.5 |
| 3,497,630 | 2/1970 | Lucas et al. | 340/172.5 X |

OTHER PUBLICATIONS

Kampe, T. W. The Design of a General-Purpose Microprogram-Controlled Computer with Elementary Structure in IRE Transactions on Electronic Computers: pp. 208– 213, June, 1960.

*Primary Examiner*—Gareth D. Shaw
*Assistant Examiner*—Melvin B. Chapnick
*Attorney*—Birch, Swindler, McKie & Beckett

[57] ABSTRACT

A program control mechanism for a data exchange installation controlled by a program stored in concentrated fashion. The program control mechanism includes a microprogram storage means which contains lists of microcommands which are accessed by a macroprogram storage means through a plurality of microprogram addresses contained in the macroprogram storage means in response to information applied thereto by a program coordinator from a requesting installation system. The accessed microcommands are transmitted from the microprogram storage means to the requesting system to allow the execution of micro-operations required for each program of macrocommands.

18 Claims, 5 Drawing Figures

Fig. 3
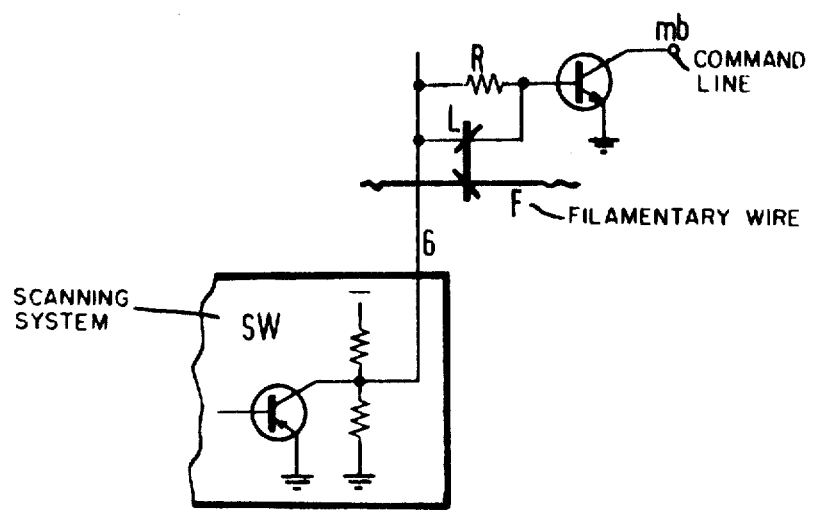
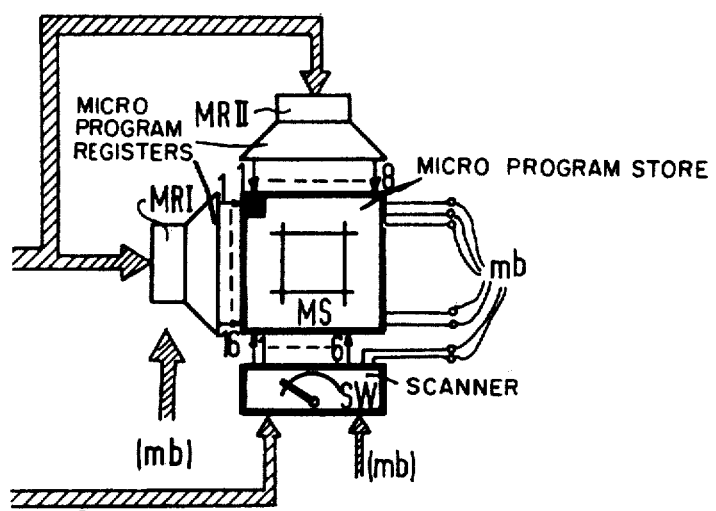
Fig.1b

3,636,522

PROGRAM CONTROL MECHANISM FOR A LONG DISTANCE COMMUNICATION EXCHANGE INSTALLATION CONTROLLED BY A CONCENTRATEDLY STORED PROGRAM

BACKGROUND OF THE INVENTION

1. Field of the Invention

The invention concerns a program control mechanism for a data exchange installation, and more particularly, a long distance communication exchange installation controlled by a program stored in concentrated form in a program storage. For the controlling of such an installation by a program there are generally available a given number of macrocommands, which must be combined in different combinations into command successions of different lengths into programs, according to which a data-processing process is to be carried out. Each macrocommand can be subdivided into microcommands, whereby the succession of microcommands which is necessary to carry out a macrooperation determined by the macrocommand is called a microprogram.

2. Description of the Prior Art

In connection with microprogramming it is already known to proceed as follows: code numbers are assigned to the individual microcommands, that is, to the same microcommand are assigned as many different kinds of code numbers as that microcommand appears in different macrocommands. (See, for example, Electronische Rundschau Vol. 10, pages 349–350 (1955); Electronische Rechenanlagen, Vol. 2, pages 3, 117, 124 (1960); and Wilkes and Stringer "Micro Programming and the Design of Control Circuits in an Electronic Digital Computer," Proceedings of the Cambridge Philosophy Society, Vol., 49, pages 230–238 (1953). With each code number there is firmly coupled first the thereto pertaining microoperation and secondly the next following code number. A microcommand places the code number for the first microcommand which is necessary to carry out the macrocommand as a dual number into a microcommand register. A decoder is connected thereto which excites that output line indicated by the code number. There is connected to the output line a further line to control the microoperation in each case.

To indicate the next-following code number each output line of the decoder leads to the input of a coding means. The calling of an output line produces at the output of the coding means, in the form of a dual number, the code number for the next microcommand. This is then deposited in the microcommand register and the process repeats itself to carry out the next microoperation.

Such a process requires within a very short time a very large number of output lines for the decoder; as many output lines as microcommand steps occur in all macrooperations.

There is further known (from German patent publication DAS 1, 151, 686 corresponding to U.S. application Ser. Nos. 819,614; 819,615; and 819,616) a storage-programmed electronic data processing system which has a first register to which there is applied a command word, controlled by a command-counting means, selected from a storage means and temporarily stored in a subsequent storage register. The outputs of the subsequent storage register are connectable, at least in part with a storage approach control in such a way that an address stored in the first register is applied to the storage approach control to callup a so-called control word, also stored in the said storage means, assigned to the command word for the complete definition of the operation to be carried out, which is brought into a second register. The outputs of the second register are connectable, at least in part, with the storage approach control to carry out the command, in the course of which a control word located in the second register can be replaced by a further control word, also stored in the mentioned storage means, the address whereof is contained in the control word contained in the second register.

Thus depending on the contents of a command word given into a first register, or of a control word already given into a further register, successively further control words are selected from one and the same storage means and placed into such a further register, with which then longer words or word successions can be formed, but at the price of a relatively high address expenditure.

The same is also true for another (from German patent publication DAS 1,250,659 corresponding to U.S. application, Ser. No. 357,372 filed Apr. 6, 1964, now U.S. Pat. No. 3,400,371) known data processing system with a principal storage means containing macrocommands with thereto assigned decoders and registers as well as with a "fixed value" storage means containing microcommand successions and controlled by output registers of the principal storage means, which controls over decoders and a thereto assigned register, the microoperation in the individual units of the data processing system. In this system ranges of the microcommand register are connected with the decoder assigned to the principal storage means, and further ranges of the microcommand register are connected with an additional decoder, which is connected, in addition, with the operation code range of the macrocommand register, whereby in both said decoders control signals are formed. These control signals determine the address of the next microcommand, over thereto assigned AND circuits. Thus here exists a continuous operation of the macrocommand on the development of the microprogram, with correspondingly high cost. Thereby successive microcommands of a microprogram are stored in successive addresses in order to make the fewest possible changes with regard to the addresses of successive microcommands pertaining to a certain microprogram.

SUMMARY OF THE INVENTION

The invention shows a way to arrive at an especially suitable structure of the command successions of a program stored in a program storage means for a program-controlled data processing system, in particular a long distance communication exchange installation, and an advantageous method for the transmission of these command successions.

The invention concerns a program control mechanism for a long distance communication exchange installation, controlled by a program stored in concentrated fashion, with a macroprogram storage means, and a microprogram storage means approached from the direction of the macroprogram store, containing microcommand successions, from the direction of which microcommands are transmitted to carry out the microoperations required in each case in the carrying out of a program of macroprograms, to the systems of the installation in question in each case. Such a program control mechanism is characterized, according to the invention, by the fact that:

1. A program coordinator in each case makes a selection of an exchange program required due to the information applied to it by scanned systems (subscriber circuits, transmission sets, thereto pertaining exchange condition storage places), and transmits an appropriate program address, with the aid of which the macroprogram storage is approached, wherein, under the program address in question, a number of microprogram addresses are stored, which does not exceed a maximum number equally large for all exchange programs.

2. A first scanning system, approaching the macroprogram store, having a number of outputs equal to the mentioned number, reads off the individual microprogram addresses stored under the program address in question, in succession, step by step, and that with the aid thereof the microprogram store is approached, wherein, under the microprogram address in each case, a number of program words, equal for all microprograms, is stored.

3. A second scanning system, approaching the microprogram store, having a number of outputs equal to the last mentioned number, reads off the individual program words stored under the microprogram address in question, step by step, in succession, so that in each case a group of program commands to be carried out simultaneously, forming the program word in question, appears on command lines individually assigned to the program commands in question.

The invention has the advantage that on one hand only a relatively low address expenditure results and thereby only correspondingly low requirements to the program storage capacity, or, a given storage capacity can be utilized advantageously, but that on the other hand also the circuit expense remains within relatively narrow boundaries, which is in particular due to the fact that the individual command successions are in each case combined of microprograms of one and the same length, so that the individual program words of such a microprogram, stored under a certain address in the microprogram storage means, can be read off step-by-step, in succession, by means of a simple, preferably cyclically operating scanning installation.

With the advantage of a clear organization there is also associated the advantage of an ability to change programs in a relatively easy way. It is thereby of special advantage according to the invention to additionally combine the previously given measures with the fact that the macroprogram store and/or the microprogram store is (are) developed as filamentary stores wherein a filamentary wire is approached by a program address, or by a microprogram address, which wire indicates by its filaments the microprogram addresses, or program words, corresponding to the program, or microprogram in question.

Thus a program is determined by an address obtained in the program coordinator, with which address a single filamentary wire is approached, which determines the addresses for all necessary microprograms, which then, in succession, are scanned by the first scanning system, whereupon, correspondingly, with each microprogram address again a filament wire is approached, which stores in its filaments all program words and therein all microprogram commands to be carried out, whereby these program words are again scanned, in succession, by a scanning system.

Through such a combination of the kind indicated, of subdividing the programs into microprograms, program words and program commands, and the application of the filamentary technique, one obtains the possibility to also arrive at constructively small program storage units, which, at the same time, can easily be changed. Thereby a modification of the given combination might be carried out to the end that the microprogram store is developed as filamentary storage, wherein with a microprogram address, a number of filamentary wires is approached which is equal to the number of the program words per microprogram, which wires by their filaments indicate in each case a program word corresponding to the microprogram in question.

The length of the individual programs, or microprograms, that is, the number of the therein combined microprograms, or program words, can be selected corresponding to other marginal conditions of the program-controlled installation. The fixing of a number of for example eight or six microprograms or program words, equally large for all programs, or microprograms in each case does not exclude the carrying out of longer or shorter programs. Moreover programs of any length can be carried out in that in further development of the invention, a program word of the last microprograms which form a longer program only together with further successions of microprograms, contains a program command, which effects the supplying to the macroprogram store of a new program address, in particular the next following, dependent on the program address last emitted by the program coordinator, under which, in the macroprogram storage, the microprogram addresses of the next succession of microprograms pertaining to the longer program in question are stored. If within a microprogram, or even within a program word, only individual commands are required, then this can be done in further development of the invention, through the fact that in the microprogram store a corresponding microprogram of the generally predetermined length is stored, the individual program words whereof contain in each case a correspondingly lower number of program commands to be executed at the same time, or contain just one, or no program command. The requirement which may occur within the data processing, or within an exchange process, to carry out a microprogram several times in succession can be taken care of, without having to lengthen the program in question correspondingly, through the fact that in further development of the invention, a program word, stored in the microprogram storage, of a microprogram to be carried out repeatedly, contains a program command preventing the transition to a next following microprogram otherwise effected by the thereto pertaining scanning system.

BRIEF DESCRIPTION OF THE DRAWINGS

FIG. 3 shows circuit details of a microprogram storage developed as a filament storage wherein filaments indicate the program words corresponding to the microprogram in question.

DETAILED DESCRIPTION OF THE INVENTION

Figure 1A:
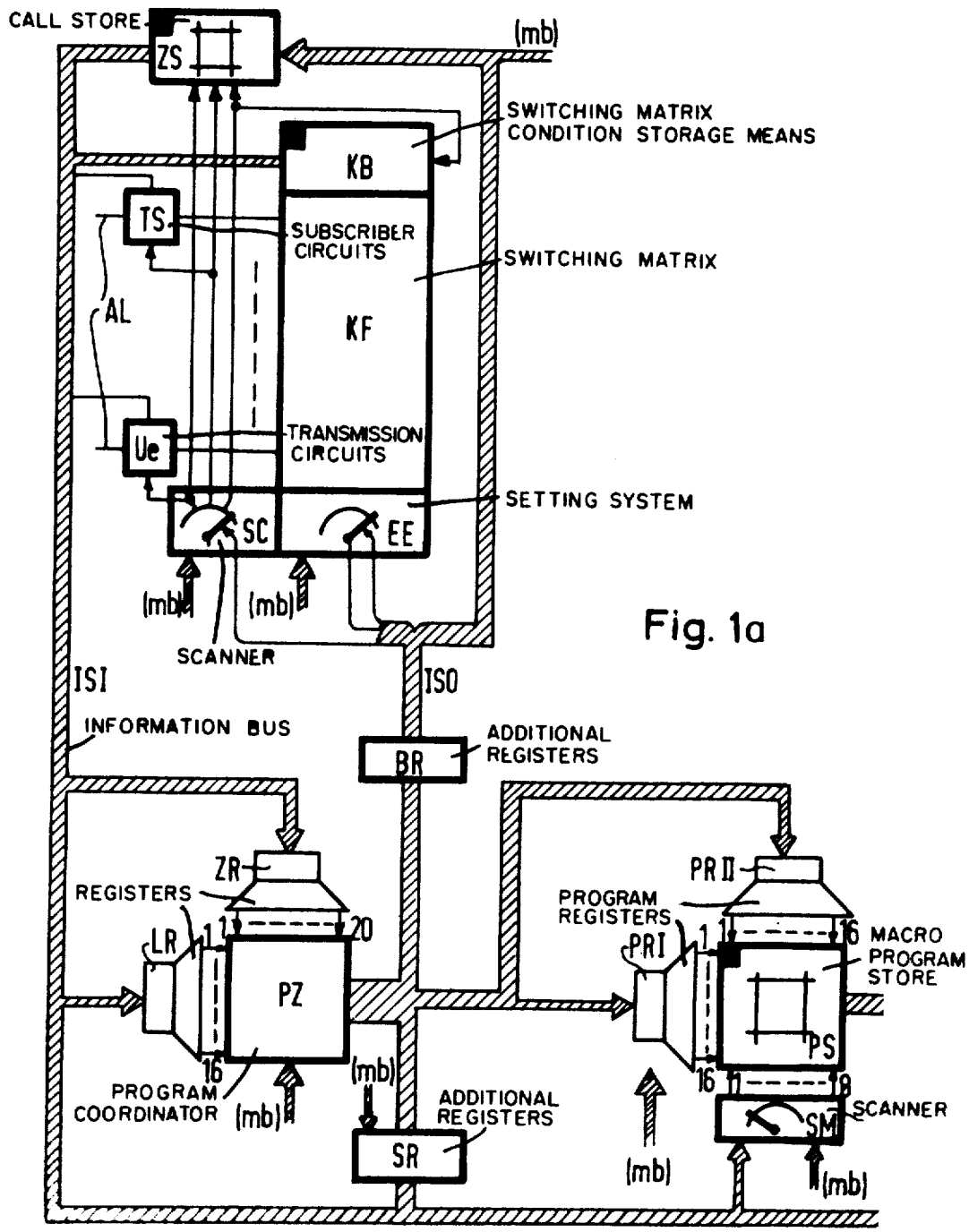
FIG. 1 constituted by FIGS. 1a and 1b with the FIG. 1b being placed against the lower right portion of FIG. 1a consisting of FIGS. 1a and 1b shows a program control mechanism according to the invention within a long distance communication exchange installation illustrated to an extent necessary to understand the invention.

In the upper part of FIG. 1a long distance communication exchange installation, controlled by a concentratedly stored program, is shown schematically, and in the lower part of the drawing the thereto pertaining program control mechanism developed according to the invention is shown. The long distance communication exchange installation essentially contains a switching matrix KF, over which connection lines AL leading to subscribers, connection sets, exchange places or the like can be connected, and into which subscriber circuits TS or transmission circuits Ue can be inserted. Switching matrixes such as may be applied in this invention are shown in U.S. Pat. No. 3,336,442, FIG. 1 (line link network, trunk link network) and in the Bell System Technical Journal, Vol. XLIII, Sept. 1964, No. 5, Part I, page 1,836, FIG. 1 (switching network). The instant condition of switching matrix KF, controllable over setting system EE, is thereby fixed in switching network condition storage means KB. A call store ZS is provided to store information relating to the operational condition of individual subscribers, connection sets and the like, the exchange condition of then existing connections or connections being established, and further information necessary to carry out the exchange operation. Call store ZS, subscriber circuits TS and transmission circuits Ue, as well as switching network condition store KB, is associated with scanner SC. Scanner SC cyclically scans the individual external systems (subscriber circuits TS, transmission circuits Ue switching matrix, or switching network condition store KB) and the storage locations of call store ZS which pertain thereto. Conventional switching network condition storage devices, call store devices, scanning arrangements and setting systems as represented herein are shown in U.S. Pat. No. 3,336,442. Subscriber circuits and other transmission circuits as represented herein are shown in U.S. Pat. No. 3,251,947 (FIG. 1).

The information thereupon emitted by the scanned systems which cause certain exchange processes to be carried out are thereby applied to information bus ISI. The information is conveyed by information bus ISI to registers LR and ZR having decoders connected thereto, and is then conveyed as control addresses in two coordinates, for example, in code (1 of 16)+(1 of 20) to program coordinator PZ. In the program coordinator, that comprises a filamentary coordinator, there is established by the information a selection of an exchange program due to said information in a single assignment step. Then the program coordinator emits a program address designating this program.

The program address macroprogram store PS is approached over program registers PRI and PRII, consisting for example of four flip-flop stages having connected decoders employing two coordinates, (for example, in code (1 of 16)+(1 of 16)) wherein, under the program address in question, a number of microprogram addresses is stored which is equally large for all exchange programs. There can be stored in macroprogram store PS under a program address eight micro program addresses. Macroprogram store PS comprises a filamentary store in which, with a program address, a filamentary connection is approached which together with its filaments indicates the microprogram addresses corresponding to the program in question.

A 1 of 16 code is a code which at any tine may comprise a binary word of 16 bits of which one bit is 1 while the other remaining bits are 0. In a 1 of 16 plus 1 of 20 code, there are two binary words, one of which comprises 16 bits of which one bit is 1, and the other of which comprises 20 bits of which one bit is also 1. In like manner, in a 1 of 16 plus 1 of 16 code there are two binary words which are constituted by 16 bits of which one bit is 1.

Figure 2A:
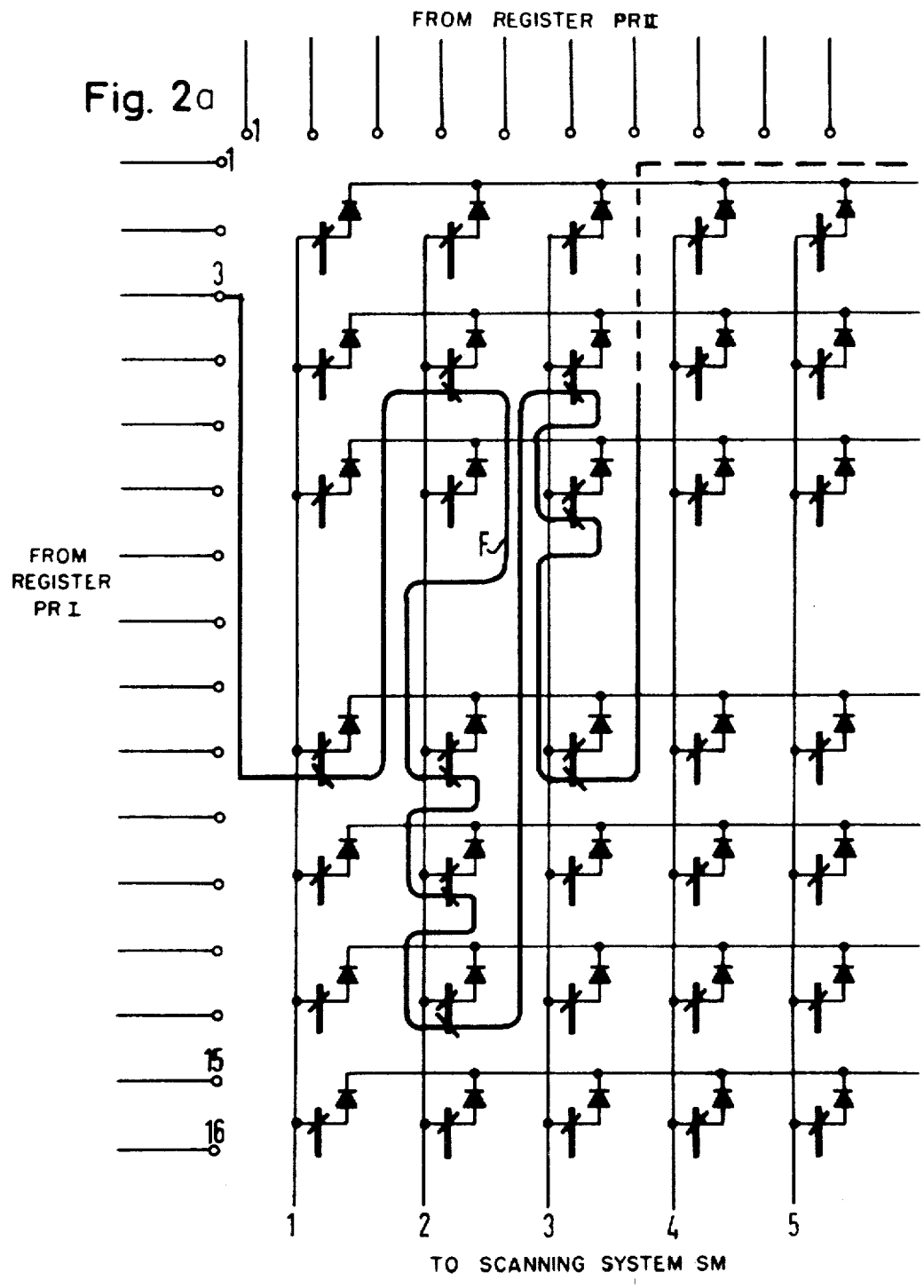
FIG. 2 constituted by FIGS. 2a and 2b with the figures being viewed with FIG. 2a to the left of FIG. 2b consisting of FIGS. 2a and 2b shows circuit details of the microprogram storage developed as a filament storage wherein filaments indicate the microprogram addresses corresponding to the program in question.
Figure 2B:
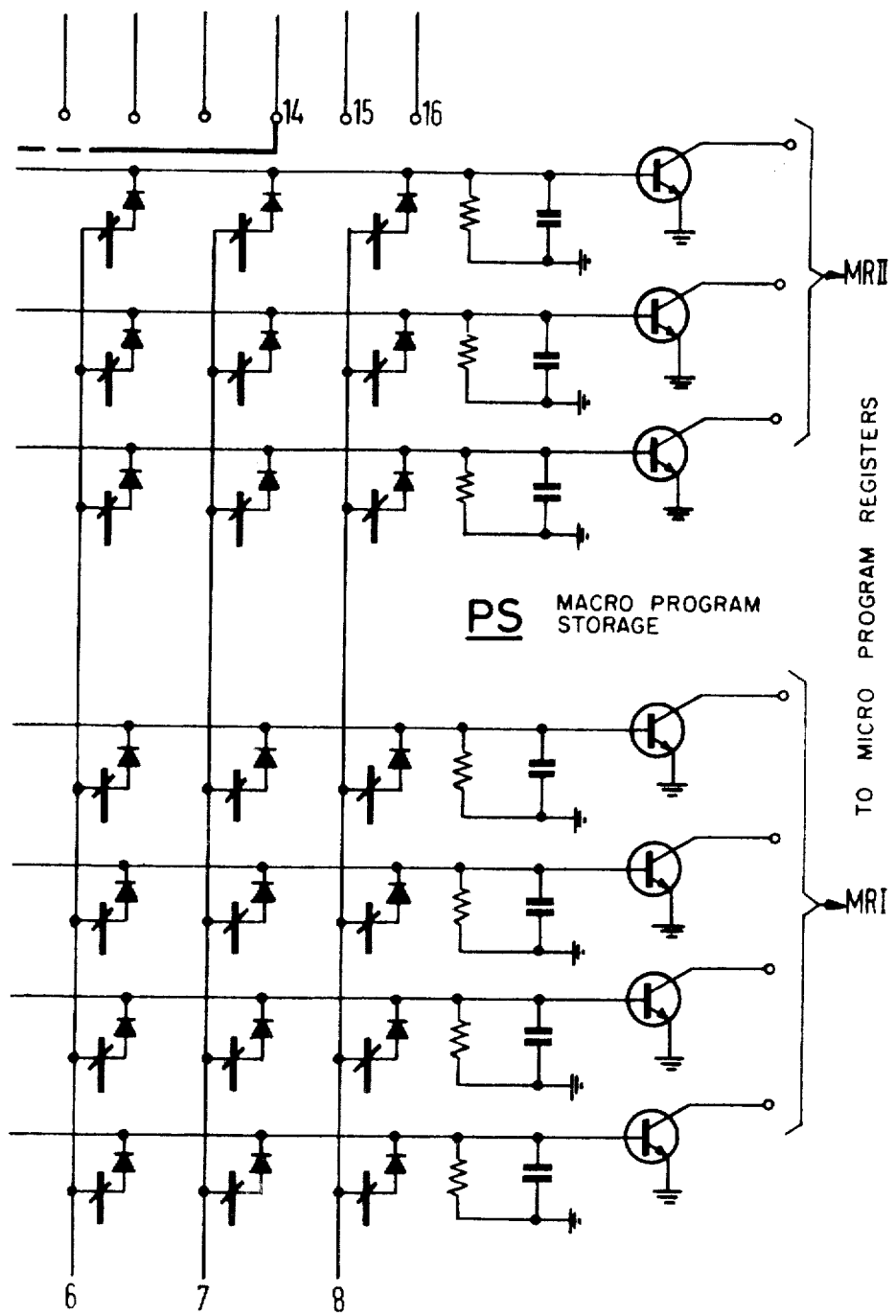

Such a macroprogram store PS is shown in more detail in FIG. 2. The essential component of macroprogram storage PS is a matrix arrangement of transmitters, divided into eight columns, corresponding to the eight microprogram addresses stored under a program address. The transmitters are combined in two groups of four or three rows. Each program is represented by a filamentary wire approachable from its two ends; that is in two coordinates, which is conducted, corresponding to the individual microprogram addresses which correspond to the program through the transmitter cores of the individual columns of the matrix arrangement. Thereby, in the development of macroprogram store PS shown in FIG. 2 (with 4+3=7 transmitters per matrix column) the filamentary wire can be threaded through each of the eight matrix columns in one of 128 different ways (corresponding to 128 different microprogram addresses).

In FIG. 2 there is further indicated for the first three matrix columns a threading of three such microprogram addresses by filamentary wire F connected to the left input 3 and to upper input 14 of macroprogram store PS. Thus based on a binary code, 000=1; 001=2; 010=3; 011=4; etc., in the first matrix column microprogram address 2/1 is threaded, in the second matrix column microprogram address 8/3 is threaded, and in the third matrix column microprogram address 2/7 is threaded. In corresponding manner the filamentary wire can also be conducted through transmitter cores of the further matrix columns and correspondingly 255 further filamentary wires, in each case representing a program, can also be conducted through the transmitter cores of macroprogram store PS. The filamentary wires traversing the transmitter cores thereby form the primary windings of the transmitter in question. Filament techniques are disclosed in U.S. Pat. No. 2,614,176 (FIG. 2); in the Bell System Technical Journal, Vol. 30, No. 3, (July 1951) pages 558 et seq., especially FIG. 7, page 604; and the I.R.E. Proceedings of the Western Joint Computer Conference, page 118, FIG. 4 (1955). Filament storage devices are shown in British Pats. 1,053,116 and 1,053,117.

In order to render the so threaded microprograms effective in succession, scanning system SM approaching macroprogram store PS is provided. Scanning system SM, which can be formed by a cyclically operating shift register, has the same number of outputs as microprograms contained in a program. FIG. 1 shows that scanning system SM has eight outputs corresponding to the eight microprograms forming a program in each case. To these outputs are connected column lines 1–8 of macroprograms store PS which according to FIG. 2 combine the secondary windings of a matrix column of transmitters.

The secondary windings are also connected in series with a decoupling diode to a row line leading to a storage output. Scanning system SM supplies—based on the conditions of FIG. 2—a negative potential and ground potential to the eighth column line. Therefore the diodes of one matrix column of transmitters are open, while the diodes of the remaining matrix columns in each case are blocked. Scanning system SM reads off the individual microprogram addresses stored under a certain program address step by step in succession, because of the fact that for a short time (for example 80 µs.) in step by step succession ground potential is connected to the individual column lines 1 to 8 of macroprogram store PS in the manner described while at the same time the filamentary wire, determined by the program address emitted by the coordinator, is correspondingly controlled in repeated impulse fashion by program registers PRI and PRII (FIG. 1). Therefore the filamentary wire receives an appropriate current. This can be effected with the aid of an additional synchronizing input provided at one of the two control decoders, over which the decoder is opened in impulse manner.

Moreover, in order to achieve high current amplitudes, thyristors can be connected to the outputs of the other decoder. The current flow therefore causes the generation of corresponding output voltages in the secondary windings of all of those transmitters through the transmitter core whereof the current-traversed filamentary wire is threaded. However the voltages become effective only in those secondary circuits which contain a diode just opened by scanning system SM. These output signals are then amplified in output transistors connected after a matrix row of transmitters, and are conveyed on to microprogram registers MRI, MRII (FIG. 1).

The microprogram registers MRI, MRII can consist of four, or three bistable flip-flop stages, to which decoders are connected. Microprogram store MS is thereby approached in two coordinates in code (1of 8)+(1 of 16) with the microprogram address in each case. In microprogram store MS a number of program words are stored under the individual microprogram addresses, the number of which is equal for all microprograms. For example in each case six or eight program words are stored under a microprogram address. Microprogram store MS suitably comprises a filamentary wire device wherein a filamentary wire is approached with a microprogram address which, with its filaments, indicates the program words corresponding to the microprogram in question. Thereby microprogram store MS can, as shown for macroprogram store PS in FIG. 2, comprise a matrix arrangement of transmitters, the primary windings whereof are formed by filamentary wires traversing in each case the transmitter core, and the secondary windings whereof are connected between a column line that is connected to an output of the thereto pertaining scanning system and, in series with a decoupling diode, to a row line leading to the store output. Such consolidation in rows of the transmitters is, however, only advisable if the number of different possible program commands, of which the individual program words can consist, is correspondingly low and these different program commands occur relatively often in the different program words. Thereby the program commands can in a given case also control a decoder connected to the storage outputs, the decoder output being connected to control inputs of the systems of the long distance communication exchange installation to be controlled.

On the other hand it is suitable, in particular with command lines leading directly to one of the systems of the long distance communication exchange installations to be controlled by the group of program commands forming the program word, to develop microprogram store MS as a matrix arrangement of transmitters, the primary windings whereof are formed by filamentary wires traversing the transmitter core, the secondary windings whereof are connected between a column line that is connected to an output of the thereto pertaining scanning system and individually to a storage output assigned to a program command, with resistance means being connected in parallel with the individual secondary windings. The circuit development of such a microprogram storage is shown in FIG. 3 in extract form. The filamentary wire is designated by F, and the secondary side of the transmitter by L. Resistor R is connected in parallel with the secondary winding, connected between a column line of an output of scanning system SW (see also FIG. 1) and over a transistor to command line mb individually assigned to a program command.

Scanning system SW serves to render effective, in succession, the individual program words of a microprogram, given by a filamentary wire F. It can be developed the same as the already above-mentioned scanning system SM (FIG. 1) by a preferably cyclically operated shift register, thereby providing as many outputs as program words are contained in a microprogram. In this connection it is indicated in FIG. 1 that scanning system SW has six outputs corresponding to six program words contained in a microprogram. The microprogram store MS then shows, accordingly, six column lines connected in each case to such an output, of which in FIG. 3 column line 6 is shown in part.

Scanning system SW now reads off, step by step, in succession, the individual program words stored under a certain microprogram address in microprogram store MS, through the fact that in each case for a short time period of about 10 microseconds, a first potential (in the conditions indicated in FIG. 3, ground potential) is connected, step by step, in succession, to the individual column lines of the microprogram store MS, while during the same time period a second potential (in the conditions shown in FIG. 3, a negative potential) is connected to the other column lines in each case. In addition, in each case for the time period mentioned, the filamentary wire determined by the microprogram address in question receives impulses from the microprogram registers MRI and MRII, and therefore a corresponding current is applied thereto. This current, as a consequence, generates corresponding output voltages in the secondary windings of all of those transmitters through the core of which the current-traversed filament wire 24, conducted. However the voltages can become effective only in those secondary circuits, for example a maximum of 24, to which the first potential, (for example, ground potential) is applied from scanning system SW over the thereto pertaining column line because, under the conditions outlined in FIG. 3, only in this case is the output transistor in question leading to command line mb controlled into the conductive state. The signal thereby appearing on command line mb represents the command in question.

In the circuit development of the microprogram store according to FIG. 3, the synchronizing frequency with which scanning system SW can control the individual columns of transmitter circuits is limited by the time constant $L/R$, where $L$ represents the functional inductance of the secondary side of the transmitter and $R$ the parallel functional ohmic resistance thereof. The synchronizing period must be sufficiently long so that the transmitter inductances can discharge sufficiently in the interim periods between the reading off in each case of two successive program words. This necessitates a minimum synchronizing period in the range of magnitude of $3(L/R)$. If higher synchronizing frequencies are desired then microprogram store MS is developed as a filamentary store wherein a number of filamentary wires equal to the number of the program words provided in a microprogram, receives a microprogram address, said wires with their filaments indicating one of the program words forming the microprogram in question. Thus for each program word of a microprogram, an individual filamentary wire is provided which requires a corresponding multiplication of the approach control system of the microprogram store for the one coordinate direction. The current flow is then released by the scanning system only for one of the filamentary wires approached by the microprogram address.

To summarize, the processing of a program with the aid of the program control mechanism according to the invention takes place in a manner that the program, selected by program coordinator PZ by reason of received information and taken into program registers PRI and PRII designates, as the address of a macroprogram storage place, the microprograms stored there in the form of addresses of microprogram storage places, forming the program in question. The microprograms are then called up, in succession, with the aid of the first scanning system SM. The microprogram called up in each case is taken into the microprogram registers MRI and MRII, and designates as address of a microprogram storage place the program words stored there forming the microprogram in question, and containing in each case a plurality of program commands. The program words then, with the aid of the second scanning system SW, are called up, in succession, for the emission of the program commands in each case.

With these program commands appearing at command lines mb (FIG. 1) combined into the mentioned microprograms in command successions always recurringly needed in the operation of the long distance exchange installation, there are then controlled as shown in FIG. 1 with arrows designated (mb) the operational processes in each case necessary in the individual systems of the long distance communication exchange installation, such as scanning, path finding, information input and output at condition store ZS, switching matrix setting, and information evaluation through program coordinator PZ. Suitably thereby such information and commands which already result directly due to the information processing through program coordinator PZ as, for example, information about a loop condition change or the therefrom resulting information, to be noted in condition storage ZS concerning the new loop condition of a subscriber just scanned by scanner SC, or commands to a certain switching matrix setting, are transmitted directly from program coordinator PZ over additional registers BR or SR (FIG. 1).

For the purpose of controlling the program the second scanning system SW has, in addition to the output shown in FIGS. 1 and 3 (for example six) which lead to microprogram store MS, two further outputs, in a given case a seventh and eighth output. In each case with the activation of the seventh output occurring within a traversing of the scanning system, a cancellation of the microprogram registers MRI and MRII and a switching-forward of the first scanning system SM by one step can be effected. This is indicated in FIG. 1 by the arrow designated (mb), leading to the first scanning system SM. In each case with the activation of the eighth output of the second scanning system SW, the synchronization input of the approach control decoder connected after program registers PRI and PRII for macroprogram store PS can be activated, so that the next microprogram address of the just carried-out program is transmitted from macroprogram store PS into the microprogram registers MRI and MRII.

As is evident from the description up to now, the individual programs in the program control mechanism according to the invention contains, principally, the same number of microprograms (for example, eight), and all microprograms contain the same number of program words (for example, six) to which—according to the above described embodiment—two further program steps of the second scanning system SW are connected. Such a fixing of equally long programs, or microprograms is advantageous with regard to circuit expenditures and clarity but does not exclude as previously emphasized, the carrying out of longer or shorter programs.

Several programs of the predetermined length can be combined as partial programs into a longer program, such that in each case a program word of the last microprogram of a first partial program, preceding a further partial program of the longer program, contains a program command which effects the supplying of a new program address dependent on the program which was heretofore in program registers PRI and PRII to macroprogram store PS. Under this new program address, there are then stored in macroprogram store PS the microprogram addresses of the next partial program pertaining to the longer program in question. Suitably the new program address is obtained by increasing the previous program address by one, whereby suitably the program register PRI, PRII (or the one part thereof, PRII) is developed at the same time—due to appropriate connection of the individual register steps—as a meter circuit. The meter input has an AND-element, one input whereof is connected to first output 1 of the first scanning system SM, and the other input whereof is connected to the output of a bistable flip-flop stage. The latter has a control input to which the program command is applied and a reset input to which a program command, contained in the last program word of the longer program, is applied for the purpose of resetting the flip-flop stage.

Similarly, also within a program—without having to lengthen it correspondingly—microprograms to be carried out repeatedly can be repeated, in that the last program word stored in microprogram store MS of the microprogram in question which is to be carried out repeatedly, contains a program command preventing the transition to a next following microprogram otherwise effected by the second scanning system SW. For this purpose a blocking member is inserted between the corresponding (for example seventh) output of second scanning system SW and the control input of first scanning system SM, over which this is switched forward, step by step. The blocking member has its blocking input connected to the output of a bistable flip-flop stage. To the control input of the latter the program command is applied, and to the return input a return command can be applied from program coordinator PZ over additional register SR.

On the other hand, shorter programs and microprograms can also be carried out, in that in macroprogram store PS, under the program address in question, in addition to the program address(es) of the microprogram(s) to be carried out, in a supplementing number another zero address, designating no microprogram store place, is stored, or a program word stored in microprogram store MS, contains, in the absence of a correspondingly large number of program commands to be carried out simultaneously, just one or not program command. Thereby—for the purpose of decreasing the time requirement in each case—a program word of the last microprogram contained in a program, suitably contains a program command effecting the resetting of the first scanning system SM (FIG. 1).

As is evident from the above description, the program control mechanism according to the invention emits, under the influence of a program address, and the microprogram addresses stored under this address, according to the program words stored under these microprogram addresses, successive groups of program commands, whereby previously the program coordinator PZ has made the generally relatively complex decision as to which is the program in question and whereby the program coordinator PZ makes the decision thereupon as to which program is then to be carried out as the next one. In the case that this is a simple yes-no decision, as it can occur for example in the course of a path finding wherein a path can only be free or seized, or in an authorization examination or wherein a certain authorization is given or not given, there is suitably stored in macroprogram store PS under the program address, in addition to the addresses of the microprograms leading to the program junction, an additional address, under which the partial program next in the "yes" case, can be reached, and in the case of modification thereof, in particular in the form of an increase of the address by one, a second address is obtained, under which the partial program next in the "no" case can be reached.

The additional address is taken over in additional register SR, and after carrying out of the program, dependent on the decision result, given, unmodified or modified, into registers LR, ZR, over which then program coordinator PZ, which has been coutilized as a program store, is approached with this additional address. Thereafter the process already explained takes place accordingly. Proceeding like this it is achieved that for certain simple decisions actually only the criteria in each case relevant therefor need be used, without the necessity that therefor in the program coordinator PZ a connection of other, actually not necessary information, would have to be made.

We claim:

1. A program control mechanism for a long distance communication exchange installation having scanned systems and controlled by a concentratedly stored program, with a macroprogram store and a microprogram store, the latter being approached from the direction of the macroprogram store and containing microcommand successions, said microcommand successions being transmitted to the systems of the installation for the execution of the microoperations necessary to carry out a program, said program control mechanism comprising:

a program coordinator (PZ) for selecting an exchange program requested by information applied thereto from a scanned system and emitting a corresponding macroprogram address to enable approachment of the macroprogram store (PS) wherein under the program address emitted a number of microprogram addresses, not exceeding a maximum number which is equal for all exchange programs, is stored, a first scanning system (SM) approaching the macroprogram store (PS), said first scanning system including a number of outputs equal to said number of microprogram addresses for reading the microprogram addresses stored under the macroprogram address, said microprogram addresses being emitted step by step in succession to enable approach of the microprogram store (MS) wherein under each microprogram address a number of program words equal for all microprograms is stored, and a second scanning system (SW) approaching the microprogram store (MS), said second scanning system including a number of outputs equal to said number of program words for reading step by step in succession each program word of the number of program words stored under a microprogram address, each of said program words including a group of program commands to be carried out simultaneously, and command lines (mb) assigned individually to each command of said group of program commands for conveying said commands to the installation systems.

2. A program control mechanism as recited in claim 1 wherein the microprogram store (MS) is connected to said macroprogram store (PS) and comprises a filamentary storage comprising filamentary wires wherein with a microprogram address said filamentary wires are approached, each of said filamentary wires indicating a program word corresponding a to said microprogram.

3. A program control mechanism as recited in claim 1 wherein the program coordinator (PZ) comprises a filamentary coordinator.

4. A program control mechanism as recited in claim 1 wherein the program coordinator (PZ) includes means for accepting information originating from the scanned systems and conveyed as approach control addresses thereto and means for selecting a necessary exchange program in a single assignment step in response to said conveyed information.

5. A program control mechanism as recited in claim 1 wherein the program coordinator (PZ) includes means for emitting in addition to a program address, commands derived directly from the information from the scanned system to a special register (BR, SR).

6. A program control mechanism as recited in claim 1 wherein the second scanning system (SW) approaching the microprogram store (MS) includes outputs for program commands controlling the exchange program.

7. A program control mechanism as recited in claim 1 wherein the microprogram store (MS) includes means for storing program words containing program commands which effect an intervention into the course of the exchange program.

8. A program control mechanism as recited in claim 7 wherein the microprogram store (MS) includes means for storing a program word of the last microprogram of a succession of microprograms which form a longer program only together with further successions of microprograms, said program word including a program command, and means responsive to said program command and to the program address last emitted by the program coordinator (PZ) for supplying the next following macroprogram address to the macroprogram store (PS) under which next following macroprogram address the microprogram addresses of the next following succession of microprograms pertaining to the longer program are stored.

9. A program control mechanism as recited in claim 7 wherein a program word, stored in the microprogram store (MS), of a microprogram to be carried out repeatedly, contains a program command preventing the transition to a next following microprogram otherwise effected by the first scanning system (SM).

10. A program control mechanism as recited in claim 7 wherein a program word of the last microprogram contained in a program contains a program command effecting the resetting of the first scanning system (SM).

11. A program control mechanism as recited in claim 1 wherein the macroprogram store (PS) includes means for storing, under a program address, in addition to the microprogram addresses of the microprograms to be carried out, a zero address designating no storage place of the microprogram store (MS).

12. A program control mechanism as recited in claim 1 wherein a program word, stored in the microprogram (MS) contains no more than oneprogram command in the absence of a larger number of program commands to be carried out simultaneously.

13. A program control mechanism as recited in claim 1 wherein the macroprogram store (PS) includes in addition to means for storing addresses of microprograms which lead to a program branch, means for storing under a program address an additional address by which the program which is next in case of one decision result of which of the at least two program paths is to be followed is fixed, means for modifying said additional address to obtain a second additional address with which the program next in the case of the other decision result is determined, and means for conveying said unmodified address into an additional register (SR) so that after the execution of the program said address is used, unmodified or modified depending on the decision then made, to approach the program coordinator (PZ).

14. A program control mechanism as recited in claim 1, wherein the macroprogram store (PS) is connected to said program coordinator (PZ) and comprises a filamentary store including filamentary wires, said filamentary wires being responsive to said macroprogram address to indicate the microprogram addresses corresponding to the selected exchange program.

15. A program control mechanism as recited in claim 1 wherein the microprogram store (MS) is connected to said macroprogram store (PS) and comprises a filamentary store including filamentary wires, said filamentary wires being responsive to a microprogram addresses to indicate the program words corresponding to said microprogram.

16. A program control mechanism as recited in claim 15 wherein at least one of the macroprogram store (PS) and the microprogram store (MS) comprises a matrix having column and row lines arrangement of transmitters and primary windings formed by said filamentary wires (F) traversing in each case the transmitter core, and secondary windings connected at one end in each case to a matrix column line (1...8; 1...6) which is connected to an output of the corresponding scanning system (SM, or SW).

17. A program control mechanism as recited in claim 16 wherein the secondary windings are connected at their other ends individually to a storage output (mb) assigned to a program command, and including resistance means (R) connected in parallel with each of said secondary windings (L).

18. A program control mechanism as recited in claim 16 wherein the other ends of the secondary windings are connected in series with a decoupling diode to a matrix row line leading to a store output.

* * * * *